United States Patent Office 3,684,702
Patented Aug. 15, 1972

3,684,702
METHOD AND APPARATUS FOR DETERMINING THE BIOCHEMICAL DECOMPOSABILITY OF SEWAGE
Ludwig Hartmann, Schneidermuhler Str. 15B, Karlsruhe, Germany
Filed Jan. 29, 1971, Ser. No. 110,911
Claims priority, application Germany, Feb. 19, 1970, P 20 07 727.4
Int. Cl. C02c 1/06
U.S. Cl. 210—3         12 Claims

ABSTRACT OF THE DISCLOSURE

Test samples of incoming sewage are mixed with relatively large samples of activated sludge from previously treated sewage and under controlled conditions the biological oxygen demand is measured in a short period of time. On the basis of this measurement the recycling of activated sludge to the main sewage aerating tanks can be accurately calculated and controlled to provide for the optimum biological decomposition of the sewage. The testing can be frequently repeated to constantly monitor the quality of the incoming sewage to provide updated information to effectively control the decomposition of the sewage under optimum conditions.

BACKGROUND OF THE INVENTION

Field of the invention

The invention relates to a method for determining the biochemical decomposability of known and unknown substrates, for example the decomposability of mixtures by microorganism in an aeration tank and for the automatic optimum control of the course of biochemical reaction in the tank. This method is preferably utilized for the biochemical decomposition of organic substances by the bacteria in the activated sludge from sewage plants, in which the microorganisms derived from the biochemical decomposition in the aerating tank are again recycled as return sludge. Also, the invention relates to apparatus for carrying out the method.

Prior art

The optimization of sewage treatment plants is frequently accompanied by great difficulties because the microorganisms used for the treatment change their physiological capacity, i.e., they react differently to the same sewage.

Furthermore, the sewage to be treated varies constantly as to quantity and composition and can in addition have fluctuating temperatures, changing pH-values and can frequently also contain toxic substances. The presence of toxic substances occurs particularly in municipal and industrial sewage treatment plants.

It is of utmost importance in planning and operating biological treatment plants for preparing sewage water for industrial use, to know the character of the sewage and its specific behavior. If the treatment is to take place by means of the known activated sludge process, the character of the sewage induces the formation of an individual biozeolite of decomposing organisms adapted to it. Inasmuch as the character of the sewage and its specific behavior can in addition change suddenly, it is also necessary to have a suitable short term adaptation of the decomposing biozeolite. The activated sludge that is utilized for treating the sewage is therefore a biozeolite of microorganisms that continuously adapts itself in its biological composition and its enzymatic reaction capacity to the composition of the sewage. Thus, it is necessary to know the manifold sewage compositions in order to optimally utilize the activated sludge method.

The multiform of the sewage or drain water, i.e., its soilage of different magnitude, can be measured by means of the biochemical oxygen demand (BOD) that is needed during the time of reaction of the activated sludge with the sewage. A graphic representation of the BOD over a time period shows a characteristic curve with a first plateau, that can be recognized more or less clearly, which is reached after a relatively short time. In accordance with more recent findings this indicates the end of one stage of the decomposition of organic sludge substances by the bacteria of the activated sludge. With special sewage (for example paper mill waste) it is possible that several such plateaus occur.

In order to judge the decomposability of sewage the quantity of activated sludge introduced to the sewage, i.e., the nutrient solution of the sewage is significant since this determines the concentration of bacteria. This relationship of the sewage concentration to the microorganism concentration is also designated as "load." If one introduces to sewage quantities of equal magnitude and equal characteristic different quantities of activated sludge, i.e., different reaction quantities, different time periods are required for the decomposition of the organic sewage substances for equal BOD.

This variable reaction course can be derived from the time consumption curves. By means of a mathematical conversion, it is possible to transfer these time consumption curves to the Lineweaver and Burk diagram (periodical: "gwf," volume 34, 1968) and determine from the equation on which this diagram is based, namely, $$V = V_{max}B/km + B$$

those quantities which are essential for the biological treatment process of the sewage water. They are the maximum decomposition velocity $V_{max}$ and the sewage concentration $km$ at which exactly ½ of the maximum velocity is attained. Together with the knowledge of the load B it is possible to determine from the given equation the reaction velocity $V$ for the decomposition process of the sewage water to be cleared.

Therefore, there is a need for a method and for an automatic apparatus by means of which a sample of the sewage matter to be treated is removed at a desired point of time and brought into contact with the microorganisms used for the fermentation. By means of this sample it is possible to control and register the change of a parameter that is typical for the reaction during the reaction, and convert the result obtained directly into a signal for controlling the main fermenter or aerating tank.

In this connection it is immaterial whether the controlling factor of the growth of the organisms is related to a gas occurrence, a gas consumption, or the possible accumulation of intermediate substances and products.

Based on the foregoing known theoretical basis a method can be devised for preparing sewage water by means of activated sludge. In accordance with that method the sewage which comes from mechanical clearing plants, for example a sedimentation tank, is conducted to an aerating tank which constitutes the main fermenter. A further sedimentation tank is connected to the aerating tank in which the sewage is separated from the water which leaves the plant as purified water. The sludge is returned as activated sludge and is at least partly admixed to the sludge ahead of the aerating tank.

Inasmuch as the holding time in a continuously supplied aerating tank is determined by the structural volume and the quantity of sewage flowing in, optimization can only take place, by exactly controlling that quantity of activated sewage which is admixed to the total decomposable sludge quantity relative to the decomposability of the sludge materials to reach the desired purification effect at the outlet of the aerating tank.

The decomposability must therefore be continually examined, i.e., the soilage of the sewage, the toxicity of the inflowing sewage as well as the possible performance and the physiological performing ability of the bacteria of the activated sludge, in order to obtain the required parameter for controlling the quantity of bacteria, i.e., the recycled quantity of activated sludge supplied to the sewage water.

This control of the quantity of return sludge, according to prior art methods, is not controlled to the extent that a biochemical purification of the sewage is possible under optimum conditions. In this connection it is particularly disadvantageous that the standard five day BOD ($BOD_5$) is used for determining the quantity of organic substrates contained in the sample of sewage water. Furthermore, depending on the composition of biozeolite present at the beginning of the test, there may be secondary reactions to an extent that can hardly be controlled.

SUMMARY OF THE INVENTION

Based on the discovery that the end of the decomposition of sludge substances by the bacteria of the activated sludge is indicated from the first plateau (or from a subsequent plateau depending on the type of sewage water) of the BOD curve, and that the course of the BOD curve depends on the load, the decomposability of a substrate mixture can be generally determined. It is a main object of the invention to provide a method for determining the composition and the biochemical decomposability of known and unknown sewage mixtures by microorganisms in fermenters and for the automatic optimum control of the biochemical decomposition. This method is utilized preferably for judging the sewage and its biochemical decomposition by means of activated sludge.

It is a further object of the invention to create a device for optimizing the operation of fermentation tanks by means of which the effect of known and unknown sewage mixtures can be automatically measured and which can be utilized for the optimum automatic controlling of fermenters or aerating tanks.

Beginning with the method discussed initially this problem is solved in accordance with the invention by taking test quantities comprised of sewage water, microorganisms (activated sludge) and thinning water and supplying these quantities in predetermined amounts to a corresponding multitude of analysis fermenters. In the individual analysis fermenters the oxygen requirement (short time BOD) needed in the biochemical reaction of the analysis quantities is measured during a predetermined reaction time and by graphic mathematical treatment of the measured results from the BOD, the desired parameter values relating to the substrate mixture and/or the physiological capability of the microorganisms are determined. The parameter values found are converted into control signals for the automatic control of the biochemical reaction course in the main fermenter.

The method in accordance with the invention provides the posibility of automatically controlling biochemical reaction courses and particularly biological sewage treatment plants, in that it makes possible the automatic determination of the BOD, in order to derive therefrom the quantity of recycled sludge that has to be added to the sewage. In particular it is possible with the method to determine in a very simple manner the percentage of decomposition in relation to the load and to derive the parameters from this relationship which are necessary for the optimum control of a biological sewage plant for a given time period of residence of the sewage water and a given quantity of sewage water, to determine exactly that quantity of recycled sludge which is admixed to provide the necessary purification effect, so that the purified water emanating from the subsequent aerating tank reflects the desired degree of purification.

If the automatic control of the sewage water plant in accordance with the method of the invention is carried out in such a manner that the decomposability and the optimum parameter for the control of the admixed quantity of activated sludge in the fermenter is determined every twenty minutes, the desired decomposition of the organic substance originally present under normal conditions will take place within the time of residence, as a rule between one to four hours, as determined by the magnitude of the fermenter and the quantity of the inflowing sewage water. By means of the optimum control of the biochemical reaction course the following disturbances are avoided.

(a) The desired purification effect which is not obtained when the required time of treatment is too short.

(b) The secondary reactions, occurring when the required time of treatment is exceeded, which reduce the bacteria in their performance capability of removing eutrophying substances.

The device essential for the judging of the decomposability of the substrate in accordance with the method of the invention comprises a dosing device and a plurality of analysis fermenters. The dosing device preferably is comprised of three dosing sections each of which has an inlet and an outlet, an intermediate groove or channel through which the dosing liquid flows and dosing chambers in communication with each groove having equal and/or different volumes. The dosing chambers of the individual sections can be connected together in such a manner, that liquid mixtures having certain different volume parts derived from the various sections can be produced. Preferably, the dosing device in accordance with the invention has three dosing sections, one of which has dosing chambers of equal volume while the other two dosing sections have dosing chambers which progressively vary in volume. In the two latter dosing sections the progressive volume change for producing the liquid mixtures in the interconnected dosing hollows takes place in opposite directions.

In accordance with a further development of the invention the dosing chambers may be closed at the bottom by means of a valve, and related outlet apertures of each one of the dosing chambers of the three dosing sections flow into a common outlet duct.

A preferred construction of the dosing device resides in that the valve is in the form of a slide which is controlled by an electromagnet that opens or closes all dosing chambers of a dosing section at a time.

In order to carry out the analysis, the analysis fermenter tank is provided with a rotating magnet outside the tank for actuating a magnetic stirring device inside the tank. The tank is provided with at least two intake openings at the top and the bottom is funnel shaped and provided at the deepest point with an outlet opening. The stirring device which freely rests on the bottom is adapted to the funnel shape and has a guiding stub extending into the outlet opening and provided with a bore connecting the interior of the vessel with the outlet opening.

An example of an application of the method in accordance with the invention as well as further features and advantages of the invention will become apparent from the following description of the method and examples of installations for carrying out the invention.

Figure 1:
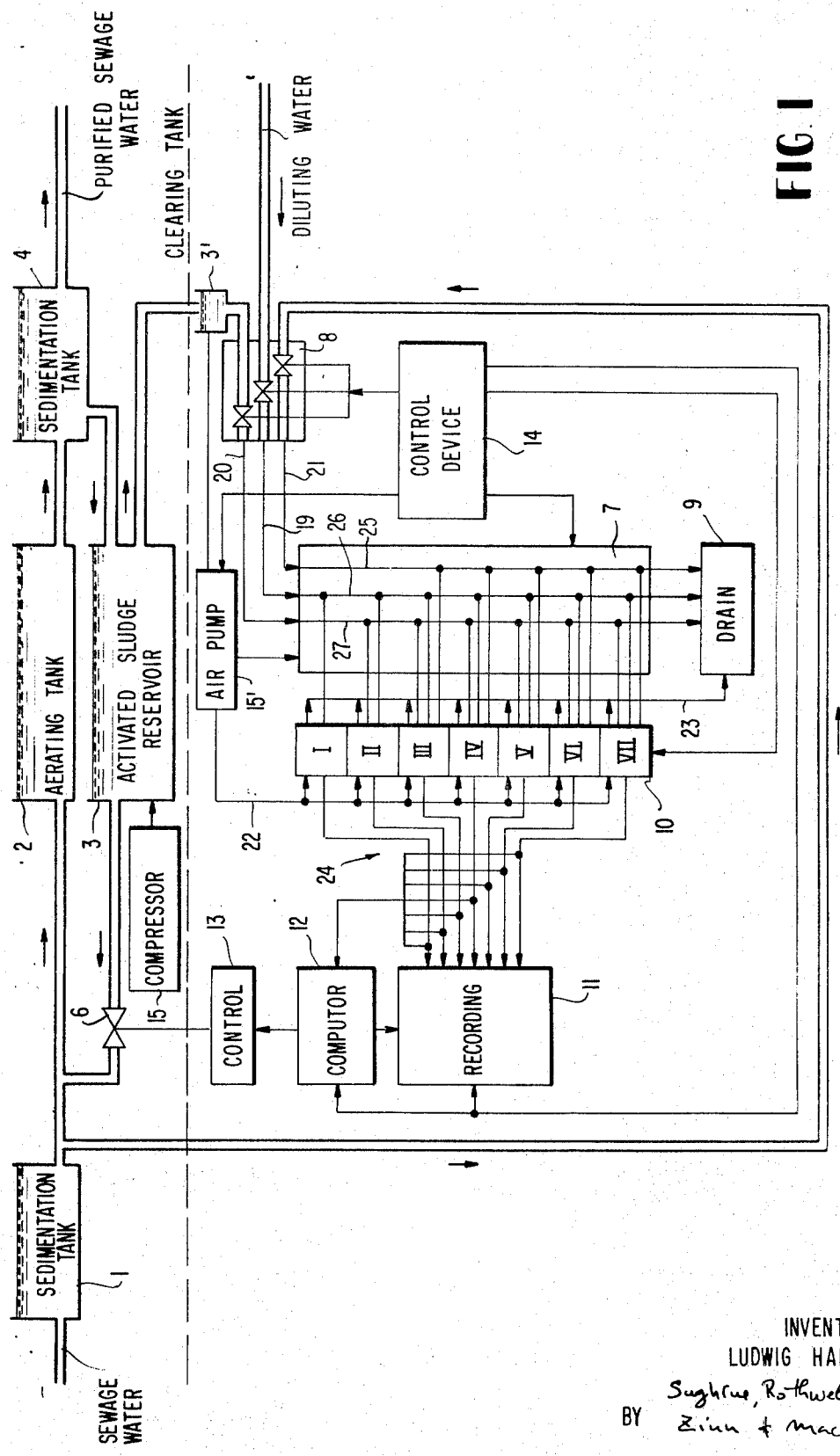
FIG. 1 is a system diagram of a sewage water purification plant whose biochemical reaction course in the aerating tank is automatically controlled in relation to an automatic determination of the optimal biochemical decomposability.

In accordance with FIG. 1 the sewage purification plant whose biochemical reaction course is controlled automatically in the aerating tank in relation to the optimal biochemical decomposability of the sewage comprises a sedimentation tank 1 in which sewage is mechanically cleared and is fed to an aerating tank 2. In the aerating tank 2 the biochemical decomposition of the solved sludge substances takes place by means of bacteria of the activated sludge from the activated sludge reservoir 3 which is mixed with sewage water prior to entrance into the aerating tank. The fresh air required for the activated reservoir is introduced by means of an air compressor 15. After termination of the biochemical reaction in the aerating tank the sludge is fed to a further sedimentation tank 4 in which a new mechanical purification takes place, i.e., the separation of the sludge from the purified sewage. The activated sludge that accumulates in this connection is at least partly utilized for addition to the activated sludge reservoir. In the return duct 5 for the activated sludge reservoir toward the intake side of the aerating tank a valve 6 is provided, by means of which the return flow quantity is controlled. In lieu of valve 6 pumps of different capacity may also be used in different combinations.

In order to determine the optimum biochemical decomposability, a sample of the activated sludge is removed from the activated sludge reservoir and is fed together with a sample of the sewage water and diluting water to a dosing device 7. A multiple valve 8 is connected ahead of the dosing device 7 by means of which the intake of the activated sludge sample, the diluting water and the sewage water sample is guided to the dosing device. The control is such that the test quantity of the dosing device 7 flows through continually and flows off by way of an outlet drain 9. Different analysis quantities are produced in the dosing device from the activated sludge, the diluting water and the sewage in various quantity proportions and are fed to the analysis fermenter 10. In the system illustrated seven analysis fermenters I to VII are provided, of which the analysis fermenter I serves as a thermobarometer and the analysis fermenter II for the determination of the zero value of the microorganisms utilized. In simple plants the functions of the analysis fermenters I and II can also be carried out in one fermenter. The analysis quantities dosed from the dosing device 7 into the analysis fermenter 10 are kept under constant movement in the fermenters while simultaneously the consumption of oxygen (BOD) of the biochemical reaction course is measured. This measuring of the consumption of oxygen can take place, for example, by means of an oxygen electrode with the analysis fermenters completely filled or by means of pressure measuring devices with the analysis fermenters partly filled. The biochemical consumption of oxygen is recorded by means of a recording device 11 and is simultaneously fed to a computer 12. In the computer 12 the ideal return flow sludge quantity is computed for a given sewage quantity fed to the aerating tank on the basis of the biochemical decomposability of the sewage water measured at that time, which is the quantity to be added to the sewage by way of valve 6, for an optimal biochemical reaction course in the aerating tank. The computer 12 has a control 13 connected to it which opens and closes the valve 6 for regulating the return flow of sludge in accordance with the computed quantity.

The installation furthermore comprises a control device 14 which is connected with the multiple valve 8, the dosing device 7 and an air pump 15' as well as the recording device 11 and the computer 12. The compressor 15 aerates the activated sludge water 3. A sample reservoir 3' for activated sludge, as well as the analysis fermenters 10 are aerated by the air pump 15' which is also utilized for emptying the analysis fermenter and the dosing device.

For observing the manner of functioning of the system in accordance with FIG. 1 for the biochemical decomposition of sewage, it is usual to consider that the time of sojourn in a continually supplied aerating tank is determined by the structural volume and the inflowing quantity of sewage. Optimizing the biochemical reaction course in the aerating tank can only be done by mixing exactly that quantity of bacteria in the form of return sludge with the sedimentation of the sludge substances and the entire decomposable quantity of sludge to effect the desired purification result at the outlet of the aerating tank.

For this purpose the decomposability of the inflowing organic sludge substances, the activated sludge and eventually the toxicity as well as the possible output and the physiological ability of the bacteria to perform are continually examined by means of the method in accordance with the invention. For this purpose, activated sludge from the reservoir 3', sewage enriched with oxygen, and diluting water which does not consume oxygen are conducted by way of the multiple valve 8 to the dosing device 7 which adds different quantities by volume of sludge and diluting water to an equal quantity by volume of activated sludge in a manner that the mixture supplied to individual analysis fermenters has for equal total volume a different load, i.e., a different ratio of sewage soilage to activated sludge quantity. In the analysis fermenters the velocity and the course of the consumption of oxygen are measured in accordance with the different load in relation to the time. If it is assumed that with the illustrated plant the analysis fermenter I serves as thermobarometer and the analysis fermenter II for determining the zero value of the bacteria present in the activated sludge, there results for the BOD measured at the analysis fermenters II–VII a course schematically characterized as that of the time volume curves in accordance with FIG. 2. Depending on the load of the bacteria in the activated sludge with organic sludge substances there is obtained after a predetermined reaction time $t_{fix}$ a different degree of decomposition. For determining the optimum decomposability, it is suitable to so determine this reaction time $t_{fix}$ that at least in one of the analysis fermenters the biochemical decomposition of the organic sludge substances has been terminated.

The time of sojourn and thus the reaction time $t_{fix}$ in the analysis fermenter can be set with the aid of the control device in that in the dosing device 7 the continually flowing test quantities from the diluting duct 19, the activated sludge duct 20 and the sewage duct 21 to the outlet 9 are dosed at a predetermined point of time into the analysis fermenters while simultaneously closing the multiple valves and remain therein until the end of the reaction time. Upon termination of the reaction time $t_{fix}$ by the control device 14, the analysis fermenters are emptied by way of discharge duct 23 with the aid of compressed air supplied by way of duct 22. Subsequently, under control of the control device 14 the multiple valve 8 is again opened and test quantities are continually supplied by way of the diluting water duct 19, the activated sludge duct 20, and the sewage water duct 21 through the dosing device to outlet 9. At a desired point of time corresponding to the desired accuracy of the control, the desired analysis quantities are again dosed from these test or sample quantities into the analysis fermenters. In this manner, the course of operation for determining the decomposability of the sewage water and the physiological capacity of the activated sludge is again repeated.

As already mentioned, the reaction time $t_{fix}$ should suitably be set in a manner that in at least one fermenter the biochemical reaction for the decomposition of the sludge substances has been terminated. Thereby the end value of the BOD can be computed from the curve for load $B_1$ for the remaining loads $B_2$–$B_5$ in proportion to the analysis quantity of the sewage water by simple multiplication. For determining the reaction time $t_{\text{fix}}$, one starts with the short time BOD and the reaction time $t_{\text{fix}}$ is so determined that it coincides with the first plateau of the BOD curve in that fermenter in which the biochemical reaction has been terminated. This plateau indicates the end of the decomposition of dissolved organic sludge substances by the bacteria of the activated sludge.

Taking into account the equation $$\text{Percent decomposition} = \frac{1}{0.01 + \alpha \cdot B}$$

it is now possible on the basis of the knowledge of the BOD of the analysis quantities for a desired percentagewise decomposition to compute that activated sludge quantity at a particular median coefficient $\alpha$ by means of the computer 12, which must be admixed to the sewage water supplied to the aerating tank 2 by means of the valve 6 from the return duct 5. The median value $\alpha$ includes the influence of the remaining median conditions, such as, for example, temperature and pH value.

Since the short time BOD reflects that the biochemical decomposition of organic sludge substances was terminated within a very short period, it is possible for optimum control of the sewage clarification to make the analysis of the decomposability, for example, at intervals of 20 minutes and thus control the plant exactly. In this connection it must also be taken into consideration that with an increasingly larger number of analysis fermenters further optimization of the control is possible.

Figure 2:
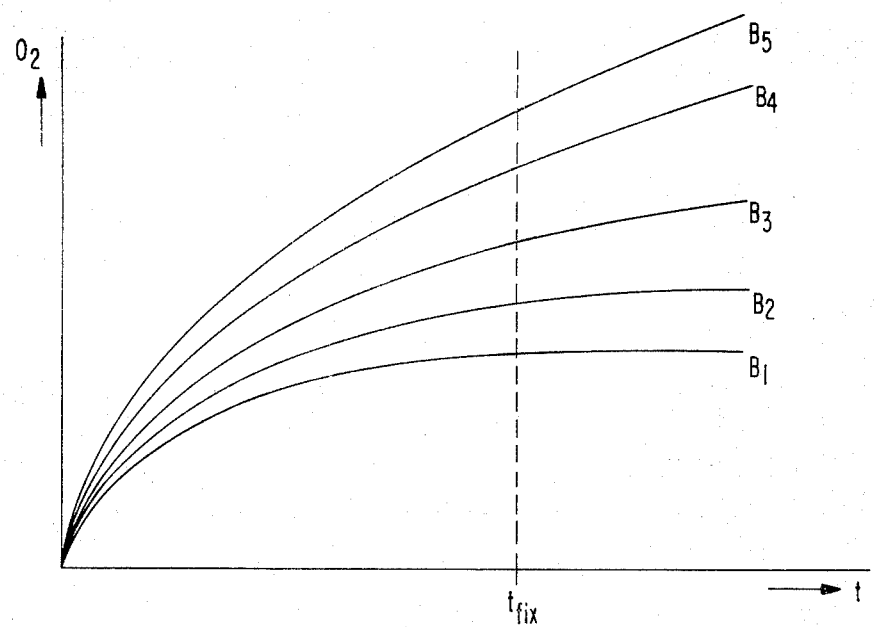
FIG. 2 is a graph showing the output (turn over) for a short time period BOD with different loads as a parameter.

By means of the schematically illustrated plant in FIG. 2 it is not only possible to control an optimum biochemical course of reaction with changing sewage composition by controlling the quantity of the back-flow sludge admixed to the sludge water, but it is also possible to further refine out of the dosed analysis quantities on the one hand and the measurement results on the other hand, by mathematical computation of known quantities, the analysis of the decomposability, in that it is determined whether and to what extent simple or complicated biological decomposition courses exist. In addition it is possible, for example, to convert the BOD curves to a different mathematical representation from which the kinetics of the reaction course can be recognized. By the use of the computer 12, which is preferably constructed as a process computer, it is possible to carry out the reaction kinetic assessment of the measured BOD curves in such a short time that in controlling the reaction course it is also possible to take into consideration an impediment of the decomposition by developed products or toxicity effects. In the event that the sludge plant is to be controlled to achieve an optimum material capacity per time period, it is suitable to base the computation of the optimum control on the equation $$V = V_{\max} \cdot B / km + B$$

It is furthermore possible by the observation and the comparison of equal percentages of degrees of decomposition to take into consideration the unmixing of a sewage substrate mixture, such as exists as a rule in sludge, for an optimum control of the clearing plant.

For controlling the sludge analysis the device 14 is programmed into three basic phases. This exemplary program course comprises in the first phase the filling of the analysis fermenter 10 by means of the dosing device, 7. In the second phase, the analysis fermenters 10 are closed, the biochemical reaction course is measured and registered, and the dosing device for the following analysis is filled. The third phase initiates after the termination of the reaction time $t_{\text{fix}}$ and comprises the emptying of the analysis fermenter 10 by means of the air pump 15' and the computation of the optimal control by means of the computer 12. For a complete course of the three phases a time period between 15 and 50 minutes will be required as a rule for the sludge water purification. However, depending upon the problem, for example, use of the analysis control device for other purposes in the fermentation art, a complete run of the three phases is possible between 10 minutes and several hours or days.

For the operation of the plant operated in accordance with the method of the invention dosing pumps can be utilized in accordance with FIG. 1 instead of the dosing apparatus, which at the desired moment remove the provided analysis quantities from the diluting water conduit 19, from the activated sludge conduit 20 and the sludge water duct 21, and in accordance with the quantity relationships provided, supply them to the analysis fermenter for the load to be analyzed.

Figure 3:
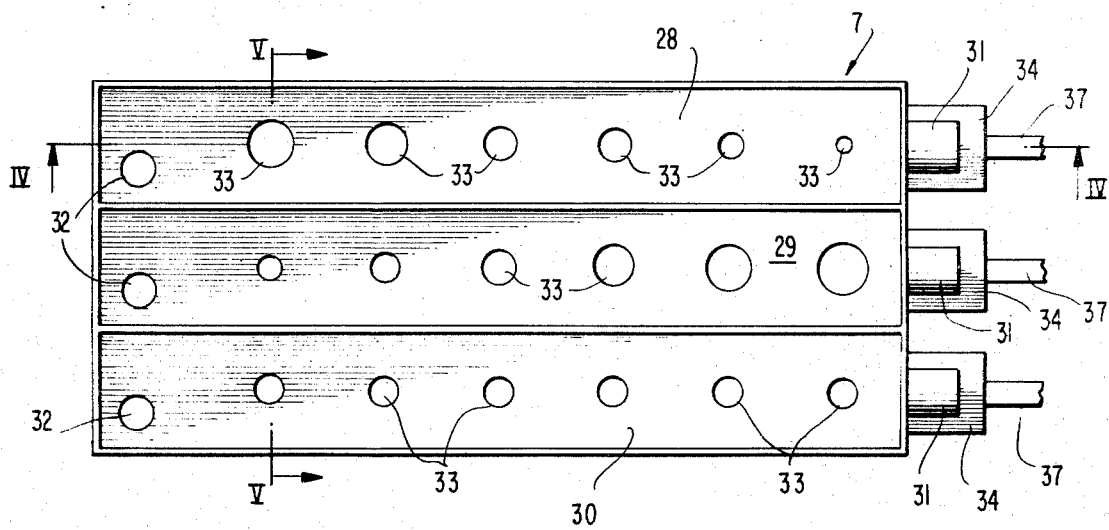
FIG. 3 is a top view of a dosing device for carrying out the method.
Figure 4:
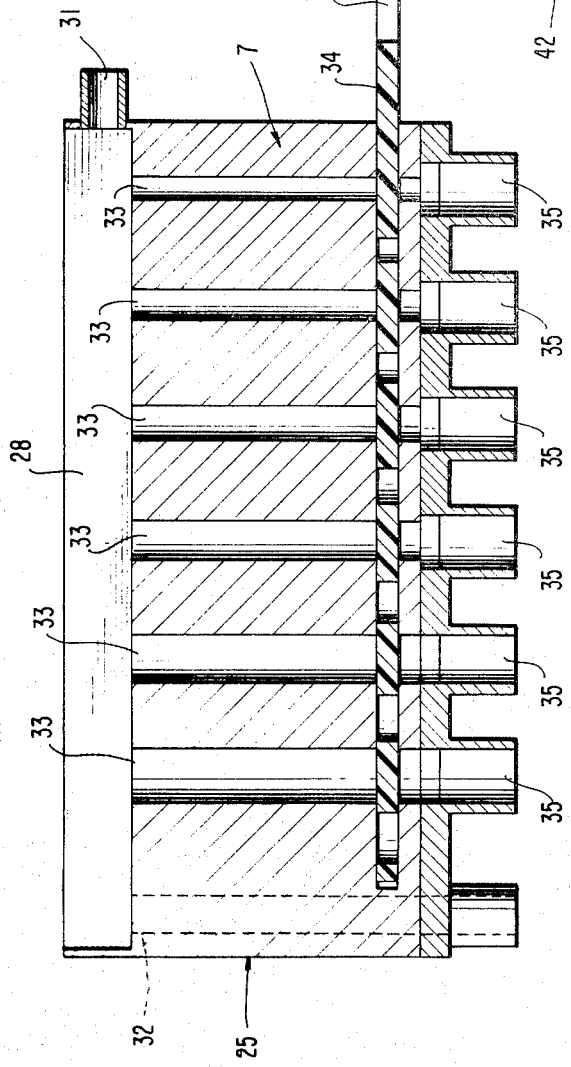
FIG. 4 is a sectional view taken along the line IV—IV in FIG. 3 with one valve fitting schematically illustrated.
Figure 5:
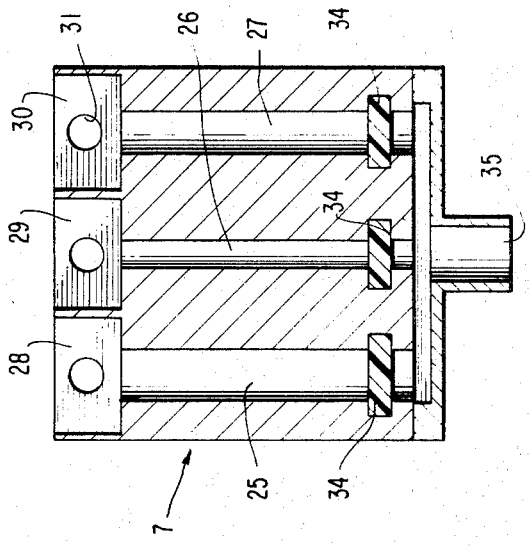
FIG. 5 is a sectional view taken along line V—V in FIG. 3.

A relatively simple dosing device which is especially well suited for carrying out the method is illustrated in FIGS. 3, 4 and 5 and is described hereinafter. This dosing device 7 in accordance with the invention comprises a material block with three adjacent dosing sections 25, 26 and 27. At the top of these dosing sections, grooves or channels 28, 29 and 30 are provided, each of which has an inlet 31 and an outlet 32. Dosing chambers 33 lead into each channel associated with the relative dosing section. The chambers 33 in dosing sections 25 and 26 are of different volume. The dosing chambers 33 of the dosing section 27 are all of the same volume. For carrying out the present method the invention provides that the dosing chambers of dosing sections 25 and 26 progressively vary in volume with the progressive change of volume in each section being in opposite directions.

The dosing chambers 33 of the individual sections are arranged to be closed by a slide valve 34 which has dosing apertures coordinated to the dosing chambers which can be brought into alignment with the dosing chambers by longitudinal sliding of the dosing slide and thus open them for discharge. The outlet ends of each set of three chambers are merged in the bottom of the dosing device and lead to a common discharge opening 35.

A slide valve operating means, as illustrated by way of example in FIG. 4, may comprise an electromagnet 36 which has a core 37 that is connected with the sliding device for the valve. This core 37 is connected by way of a spring 38 with a fixed point with the spring holding the slide in locked position with the apertures closed. By connecting the electromagnet 36 to a suitable source of current the core 37 is pulled into the electromagnet and thus the slide valve is moved to the open position.

For operation of the dosing device 7 illustrated in FIGS. 3 to 5, the dosing section 25 is connected with the sewage water conduit 21, the dosing section 26 with the diluting water conduit 19 and the dosing section 27 with the activated sludge duct 20. Upon opening the multiple valve 8 in accordance with FIG. 1 the test quantities flow into the channels 28, 29 and 20 and fill the dosing hollows 33 that are closed at the bottom by means of the valve slides 34. The test quantities flow continuously by way of the opened multiple valve 8 and through the corresponding outlet 32, so that at all times the dosed analysis quantities are available.

If as a result of the course of the program the analysis quantities are to be supplied to the analysis fermenter, multiple valve 8 is first closed so that the excess test quantities flow off by way of the corresponding outlet 32 and the dosing hollows 33 are only filled with the desired analysis quantities. Now by actuating the electromagnet 36 under the control of control device 4 the valve slides 34 are displaced in such a manner that the analysis quantities coordinated with one another are conducted by way of the common outlet conduit 35 to the associated analysis fermenter 10. The individual dosing sections of the dosing device 7 can be hermetically closed relative one another, and be connected with the air pump 15 so that by means of excess pressure effective after opening of the valve slide 34 the dosed liquids are completely and rapidly forced into the coordinated analysis fermenters.

As soon as the dosing hollows are empty the valve slides 34 are again closed, and by corresponding opening of the multivalve 8 the inflow of the test quantities is resumed. Thus, after a short time the desired analysis quantities for the next analysis are available at the dosing device.

Figure 6:
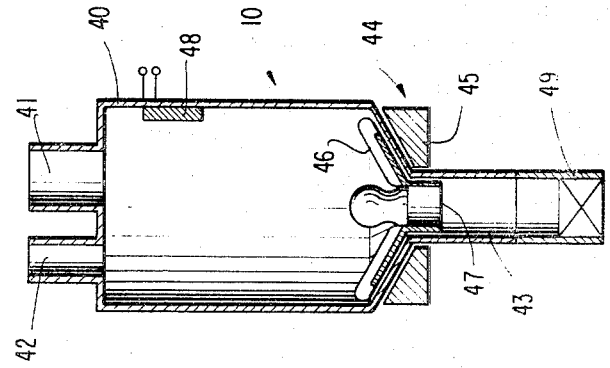
FIG. 6 is an analysis fermenter for carrying out the method in accordance with the invention.

An analysis fermenter that is especially advantageous for carrying out the method in accordance with the invention is shown in FIG. 6. In accordance with the illustration the analysis fermenter 10 comprises a cylindrical vessel 40, that at its top has an inlet 41 and a further aperture 42 for connection to the air pump. The vessel 40 is of funnel shape at the bottom and merges with a discharge opening 43. A stirring device 44 is secured to the bottom of the vessel and comprises a rotating magnet 45 as well as a funnel-shaped stirring element 46 that has a hollow guide stub which projects into the discharge opening 43. This stirring element is preferably in the form of a propeller and may consist of a cast element of plastic in which ferromagnetic particles are embedded which follow the rotating magnet and thus impart movement to the stirring element. At the inside of the housing 40 a measuring probe element 48 is provided which may consist, for example, of an oxygen electrode or a pressure measuring box. If a pressure measuring arrangement is used suitable provisions may be made for sealing the vessel openings.

In operation, the mixed analysis quantities are fed to the analysis fermenter 10 from the doser by way of the inlet 41. The analysis quantities are so proportioned in their total volume that they fill the analysis fermenter to the desired extent. A valve 49 in the outlet opening of the analysis fermenter is closed during the reaction period. This valve is controlled by the control device 14. After termination of the reaction time $t_{fix}$ the valve 49 in the discharge opening is opened and by means of compressed air supplied through opening 42 reaction liquid from the analysis fermenter is discharged to the outlet opening. During the reaction time the BOD is measured by means of the measuring probe 48 and the measured values are transmitted by measuring leads 24 to the recording device 11 and to the computer 12.

The analysis apparatus that consists of the dosing device and the analysis fermenter described above can be employed in many ways for examining a biochemical reaction course. Thus, the device is not only usable in connection with the method described with reference to FIG. 1 for determining the decomposability of sewage by means of bacteria of the activated sludge, but it can be utilized much more generally in the fermentation art as an analysis device for determining the physiological capacity of known and unknown microorganisms by introducing certain nutrient substrates. The analysis device has further possibilities of utilization, for example, for analysis of the utilization of single and mixed substrates by means of known microorganisms for examining toxic influences of given substances, for the handling of known or unknown nutrient substances with microorganisms, for examing the decomposability or toxicity of new synthetic substances, for observing the change in the nutrient character continuously flowing unknown nutrient mixtures, for examining the unmixing of mixed substrates during the decomposition by microorganisms and for examining the regeneration of microorganisms, for example, of yeasts. A simplified embodiment of the analysis device may also be used, for example, as a sensing device for determining toxic sewage waters in which only two analysis fermenters are employed. With this type of application of the analysis device, for example, one analysis fermenter is continually supplied with sewage water, bacteria and an additional nutrient, while the other analysis fermenter contains only bacteria and the additional nutrient. If, now the oxygen consumption per time unit is smaller in the first fermenter than in the second fermenter, an impediment or poisoning of the bacteria exists. This different change of the consumption of oxygen can be utilized for releasing an alarm installation or for initiating counter measures.

With a utilization of the simplified embodiment of the analysis device as a sensing device for toxic sewage this analysis device can be constructed in such a manner that it can be installed in any sewage channel for which one assumes that toxic sewage waters are introduced. With this manner of deployment, it is suitable to record the timely different oxygen consumption of the two analysis fermenters of the sensing device, so that upon termination of a certain testing time, for example one night, the presence of toxic sewage waters can be determined.

What is claimed is:

1. A method for determining the biochemical decomposability of mixtures by microorganisms to obtain the optimum control parameters necessary for automatically adjusting the biochemical course of reaction in an aerating tank of the type used for the biochemical decomposition of organic sludge substances by the bacteria of activated sludge which is recycled in predetermined amounts to the incoming sewage comprising
    (a) isolating predetermined quantities of incoming sewage, activated sludge and distilled water in a dosing device,
    (b) mixing said quantities of sewage water and said activated sludge in at least one analysis fermenter,
    (c) mixing said quantities of activated sludge and distilled water in at least one another analysis fermenter,
    (d) measuring the biological oxygen demand in each of said analysis fermenters,
    (e) recording said measurements and
    (f) converting said measurements into control signals for the automatic control of the recycling of activated sludge to incoming sewage.

2. A method as set forth in claim 1 wherein said control signals for controlling the amount of activated sludge which is to be added to the incoming sewage which is to be decomposed are determined for an optimum biochemical course of reaction while the incoming sewage concentration is changing in accordance with the equation $$\text{Percent decomposition} = \frac{1}{0.01 + \alpha.B}$$

where the percentage decomposition is derived from the measurement of the biological demand of all analysis quantities, B is the charge of all individual analysis quantities and $\alpha$ is a median coefficient.

3. A method as set forth in claim 1 wherein the control signals for controlling a biochemical course with an optimum conversion of material per unit of time are determined with the equation $$V = V_{max} \cdot B$$
$$km = B$$

4. A method as set forth in claim 1 wherein distilled water only is supplied to an additional analysis fermenter to serve as a thermobarometer.

5. A method as set forth in claim 1 wherein the analysis fermenter containing activated sludge and distilled water serves for determining the zero value of the microorganisms used.

6. An apparatus for determining the biochemical decomposability of incoming sewage by microorganisms in activated sludge comprising dosing means for isolating a plurality of predetermined quantities of incoming sewage, activated sludge and distilled water, valve means for selectively combining said quantities into a plurality of predetermined combinations, analysis fermenter means adapted to receive said plurality of predetermined combinations, measuring means for measuring the biological oxygen demand in each of said analysis fermenters having activated sludge therein, recording means for registering the biological oxygen demand, and computing means for converting the measurements into signals for controlling the recycling of activated sludge into incoming sewage.

7. An apparatus as set forth in claim 6 wherein said dosing means is comprised of three dosing sections each of which has an inlet, an outlet and an elongated channel extending therebetween, a plurality of measuring chambers communicating with said channel to receive liquid supplied to the channel and valve means disposed at the lower end of said chambers.

8. An apparatus as set forth in claim 7 wherein the chambers associated with each channel are disposed in transverse alignment with the chambers of the other channels, common transverse passage means associated with and communicating with each group of three chambers one of which is associated with each channel, said valve means operable to simultaneously control the communication of each of the chambers associated with a particular channel with the passage means.

9. An apparatus as set forth in claim 8 further comprising connecting means for connecting each of the transverse passage means to a respective analysis fermenter means.

10. An apparatus as set forth in claim 7 wherein the chambers communicating with a first one of said channels are all of equal volume, the chambers communicating with a second one of said channels progressively decrease in volume from said inlet to said outlet and the chambers communicating with the third one of said channels increase in volume from said inlet to said outlet.

11. An apparatus as set forth in claim 6 wherein said analysis fermenter means is comprised of a cylindrical chamber having a funnel shaped bottom portion with an outlet at the lowest point thereof, valve means for opening and closing said outlet, stirring means slidably and freely resting on said funnel shaped bottom and having a guide stub projecting into said outlet.

12. An apparatus as set forth in claim 11 wherein said steering means is comprised of ferromagnetic material and further comprising magnetic means rotatably mounted about said funnel shaped bottom to impart movement to the stirring means upon rotation thereof.

References Cited

UNITED STATES PATENTS

| | | | |
|---|---|---|---|
| 3,249,403 | 5/1966 | Bochinski et al. | 23—253 R |
| 3,596,767 | 8/1971 | Antonie | 210—96 |

MICHAEL ROGERS, Primary Examiner

U.S. Cl. X.R.

23—230, 253; 195—103.5; 210—96